(12) United States Patent
Gao et al.

(10) Patent No.: US 10,699,568 B1
(45) Date of Patent: Jun. 30, 2020

(54) VIDEO-BASED CROSSROAD SIGNAL MACHINE CONTROL METHOD

(71) Applicant: HEFEI GELV INFORMATION TECHNOLOGY CO., LTD., Anhui (CN)

(72) Inventors: Wanbao Gao, Anhui (CN); Guanglin Zhang, Anhui (CN); Huiling Li, Anhui (CN)

(73) Assignee: HEFEI GELV INFORMATION TECHNOLOGY CO., LTD., Anhui (CN)

( * ) Notice: Subject to any disclaimer, the term of this patent is extended or adjusted under 35 U.S.C. 154(b) by 63 days.

(21) Appl. No.: 16/309,463

(22) PCT Filed: Oct. 31, 2018

(86) PCT No.: PCT/CN2018/112974
§ 371 (c)(1),
(2) Date: Dec. 13, 2018

(87) PCT Pub. No.: WO2019/179108
PCT Pub. Date: Sep. 26, 2019

(30) Foreign Application Priority Data

Mar. 22, 2018 (CN) .......................... 2018 1 0238073

(51) Int. Cl.
*G08G 1/07* (2006.01)
*G08G 1/08* (2006.01)
*G08G 1/01* (2006.01)
*G08G 1/083* (2006.01)
*G08G 1/095* (2006.01)

(52) U.S. Cl.
CPC ............. *G08G 1/08* (2013.01); *G08G 1/0145* (2013.01); *G08G 1/083* (2013.01); *G08G 1/095* (2013.01)

(58) Field of Classification Search
CPC .................................. G08G 1/08; G08B 1/015
USPC .......... 340/917, 909, 911, 913; 701/117, 118
See application file for complete search history.

(56) References Cited

U.S. PATENT DOCUMENTS

2008/0094250 A1* 4/2008 Myr .......................... G08G 1/04
340/909
2019/0051152 A1* 2/2019 Malkes .................. G08G 1/081

* cited by examiner

*Primary Examiner* — Tai T Nguyen
(74) *Attorney, Agent, or Firm* — JCIPRNET

(57) ABSTRACT

The present application discloses a video-based crossroad signal machine control method, which includes: installation of video detectors; data acquisition and communication; signal control optimization algorithm processing; signal command issue and signal light control. The application adopts active video detection technology, which can accurately detect the traffic state of single crossroad, formulate an optimized signal control scheme, provide optimal decision and emergency plan for the control of traffic light of the main road, improve the traffic efficiency of crossroad and effectively alleviate traffic congestion on the crossroad.

8 Claims, 4 Drawing Sheets

VIDEO-BASED CROSSROAD SIGNAL MACHINE CONTROL METHOD

This application claims priority to Chinese Patent Application No. 201810238073.2, filed to the Chinese Patent Office on Mar. 22, 2018, entitled "Video-based crossroad signal machine control method", the entire disclosure of which is incorporated herein by reference.

TECHNICAL FIELD

The present invention relates to the technical field of traffic signal optimization control, and in particular, to a video-based crossroad signal machine control method.

BACKGROUND OF THE INVENTION

Urban congestion and accidents are increasingly frequent. In particular, traffic congestion at intersections is severe. If traffic flows cannot be effectively channeled in real time, road congestion will spread, and the efficiency of intersections will be reduced, causing great time and economic losses to the public. Video vehicle detection technology is to install video capture equipment on roads with complicated conditions or easy to form congestion, detect the number, speed and queue length of passing cars, and transmit the collected data back to the server center through wired or wireless network for processing. Technology, through the real-time acquisition of traffic parameters, dynamic traffic signal control can be carried out to achieve effective law of traffic flow, and to minimize traffic congestion.

At present, the signal control methods mainly include timing control, multi-time control, induction control, and adaptive control. The traditional model algorithm is too rigid to set the threshold according to the change of a certain traffic parameter to optimize the signal, which will cause the system to misjudge the state.

SUMMARY OF THE INVENTION

Based on the technical problems existing in the background art, the present application proposes a video-based crossroad signal machine control method.

The video-based crossroad signal machine control method proposed by the present application includes:

S1. collecting lane traffic flow rate and lane traffic flow density of each entrance road section within a preset time interval, by means of video vehicle detectors arranged on each entrance road section of the crossroad;

S2. calculating average traffic flow rate and average traffic flow density of each entrance road section of the crossroad based on lane traffic flow rate and lane traffic flow density of each entrance road section within the preset time interval;

S3. calculating the average traffic flow density of the crossroad based on the average traffic flow density of each entrance road section;

S4. calculating an intersection signal period of the crossroad based on the average traffic flow density at the crossroad;

S5. constructing a crossroad signal machine optimization control algorithm model based on the average lane traffic flow rate of each entrance road section and the average traffic flow density of the crossroad, and obtaining the object signal control green signal ratio of each entrance road section of the crossroad by the aggregation calculation;

S6. calculating a green time, a yellow time, and a red time of the crossroad signal timing based on the object signal control green signal ratio and the crossroad signal period;

S7. forming a signal control scheme instruction for the next signal period of according to the green time, the yellow time and the red time of the crossroad signal timing;

S8. controlling the traffic light of the crossroad carrying out traffic dynamic induction according to the signal control scheme instruction of the next signal period, after the end of the period control scheme of the traffic light.

Preferably, S2 specifically includes:
the average traffic flow rate of each entrance road section $$\bar{q} = \sum_{n=1}^{N} q_n / N,$$

where n is the number of the lane, and N is the total quantity of lanes of the entrance road section, $q_n$ is the lane traffic flow rate of the lane n;

the average traffic flow density of each entrance road section $$\bar{k} = \sum_{n=1}^{N} k_n / N,$$

where n is the number of the lane, and N is the total quantity of lanes of the entrance road section, $k_n$ is the lane traffic flow density of the n-th lane.

Preferably, S3 specifically includes:
the average traffic flow density of the crossroad $$K = \sum_{m=1}^{M} \bar{k}_m / M,$$

where m is the number of the entrance road section of the crossroad, M is the total quantity of entrance road section of the crossroad, $\bar{k}_m$ is the average traffic flow density of the m-th entrance road section.

Preferably, S4 specifically includes:
the signal period of the crossroad $$C = \begin{cases} 40 & K \leq 6 \\ 60 & 6 < K \leq 12 \\ 90 & 12 < K \leq 24 \\ 120 & 24 < K \leq 48 \\ 150 & 48 < K \leq 90 \\ 180 & K > 90 \end{cases},$$

where K is the average traffic flow density of the crossroad.

Preferably, S5 specifically includes:
S51. establishing a Cartesian coordinate system at the center of the intersection, calculating the average traffic flow rate $\bar{q}_{13}$ of the X-axis direction section, and calculating the average traffic flow rate $\bar{q}_{24}$ of the Y-axis direction section;

S52. establishing an optimization signal control objective function $\omega K(t)+\dot{K}(t)=0$ based on feedback control;

establishing a dynamic traffic flow density variation model $$\dot{K}(t) = \lim_{\Delta t \to 0} \frac{r_{13}\bar{q}_{13}\Delta t/L + (1-r_{13})\bar{q}_{24}\Delta t/L}{\Delta t} = \frac{r_{13}(\bar{q}_{13} - \bar{q}_{24}) + \bar{q}_{24}}{L};$$

combining the optimization signal control objective function and the dynamic traffic flow density variation model to calculate the green signal ratio $$r_{13} = \frac{\omega KL + \bar{q}_{24}}{\bar{q}_{24} - \bar{q}_{13}}$$

in the X-axis direction, where w>0, K(t) is the average traffic flow density of the crossroad at time t, $\dot{K}(t)$ is the derivative of the average traffic flow density of the crossroad at time t, where L is the length of the entrance road section, $\Delta t$ is an infinitely short time.

Preferably, S51 specifically includes:
$\bar{q}_{13}=(\bar{q}_1+\bar{q}_3)/2$, where $\bar{q}_1$ is the average traffic flow rate from the negative X-axis direction to the positive X-axis direction, $\bar{q}_3$ is the average traffic flow rate from the positive X direction to the negative X-axis direction;
$\bar{q}_{24}=(\bar{q}_2+\bar{q}_4)/2$, where $\bar{q}_2$ is the average traffic flow rate from the negative direction of the Y-axis to the positive direction of the Y-axis, and $\bar{q}_4$ the average traffic flow rate from the positive direction of the Y-axis to the negative direction of the Y-axis.

Preferably, S6 specifically includes:
the green time of the entrance road section in the X-axis direction of the crossroad signal timing $G_{13}=C\times r_{13}$, the red time of the green time of the entrance road section in the X-axis direction $R_{13}=C-G_{13}-Y$, Y is the preset yellow time, and C is the crossroad signal period.

Preferably, S6 further includes: setting a threshold $G_{13}$ of the green time in the X-axis direction as $10 \leq G_{13} \leq C-10$.

This application is based on the feedback control theory, extracting the signal control optimization algorithm of intersection, through the real-time detection and comprehensive analysis of the average traffic density of the crossroad, which can greatly improve the traffic operation efficiency of the crossroad; Using two-dimensional active video technology, the real-time traffic status of single crossroad are accurately detected on the main road, formulating an optimal signal control scheme, providing real-time decision-making and emergency response information for traffic management and control, and improving crossroad traffic efficiency and service level.

DETAILED DESCRIPTION OF THE INVENTION

Refer to FIGS. 1-4, the present application proposes a video-based crossroad signal machine control method, which including:

S1. collecting lane traffic flow rate and lane traffic flow density of each entrance road section within a preset time interval, by means of video vehicle detectors arranged on each entrance road section of the crossroad.

Figure 1:
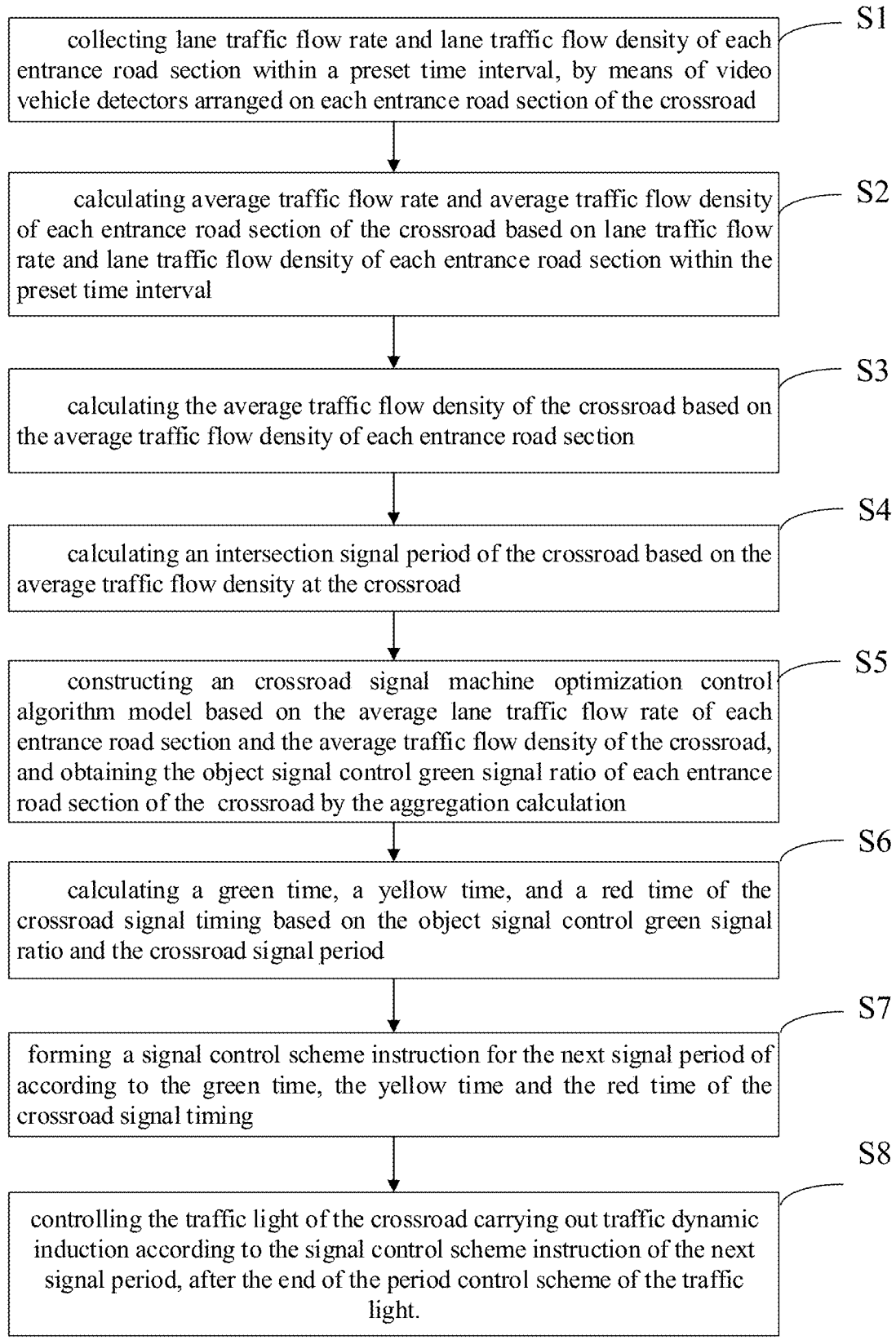
FIG. 1 is a schematic flow chart of a video-based crossroad signal machine control method according to the present application.
Figure 2:
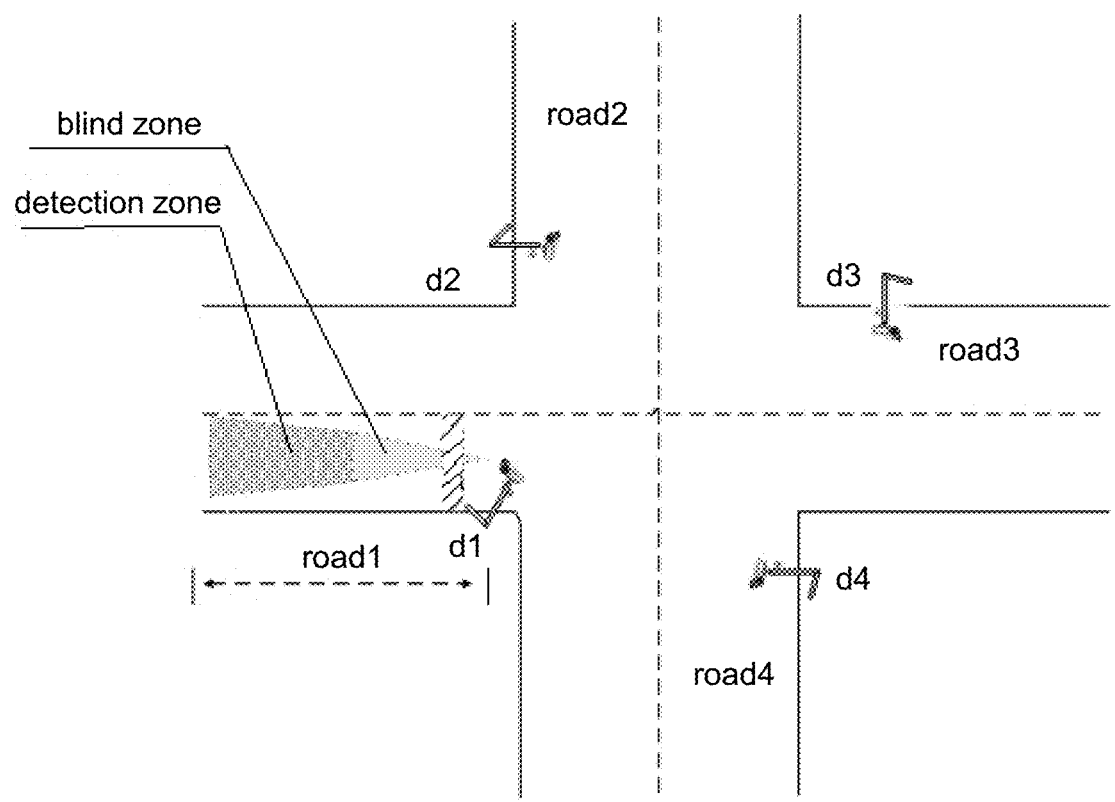
FIG. 2 is a schematic diagram of installation of a video-based crossroad signal machine control method.

In the specific embodiment, for example, the intersection is a 4 in 4 out crossroad, and the range of the entrance road section that the video vehicle detector can detect is 10 meters to 100 meters. The blind area is within 10 meters ahead of the installation position, and the dynamic information of the vehicle can't be detected in the blind zone. Therefore, the installation position of video vehicle detector at the crossroad is very important. After determining the entrance road section to be detected, the detection zone and the blind zone critical line are located 10-20 meters ahead of the parking line. The general installation diagram of the crossroad is shown in FIG. 2.

The data format collected by the video vehicle detector is (t,n,q,k) where t indicates the acquisition time, n indicates the number of the lane, q indicates is the lane traffic flow rate, and k indicates the lane traffic flow density. The units of (t,n,q,k) are respectively seconds, 1, vehicle/hour/lane and vehicle/Km/lane.

Figure 3:
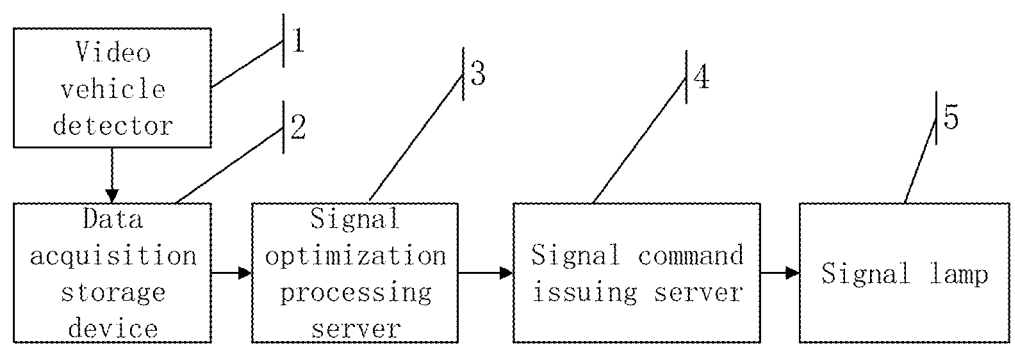
FIG. 3 is a schematic diagram of equipment connection in the present application.

As shown in FIG. 3, the equipment used in the method includes a video vehicle detector 1, a data acquisition storage device 2, a signal optimization processing server 3, a signal command issuing server 4 and signal lamp 5, the data acquisition storage device 2 and the video vehicle detector 1 are connected by cables and then installed on the monitoring frame of the crossroad, and the above devices are connected by signal in sequence.

S2. calculating average traffic flow rate and average traffic flow density of each entrance road section of the crossroad based on lane traffic flow rate and lane traffic flow density of each entrance road section within the preset time interval.

S2 specifically includes: the average traffic flow rate of each entrance road section $$\bar{q} = \sum_{n=1}^{N} q_n/N,$$

where n is the number of the lane, and N is the total quantity of lanes of the entrance road section, $q_n$ is the lane traffic flow rate of the lane n;

the average traffic flow density of each entrance road section $$\bar{k} = \sum_{n=1}^{N} k_n/N,$$

where n is the number of the lane, and N is the total quantity of lanes of the entrance road section, $k_n$ is the lane traffic flow density of the n-th lane.

S3. calculating the average traffic flow density of the crossroad based on the average traffic flow density of each entrance road section.

S3 specifically includes:
the average traffic flow density of the crossroad $$K = \sum_{m=1}^{M} \bar{k}_m/M,$$

where m is the number of the entrance road section of the intersection, M is the total quantity of entrance road section of the intersection, $\bar{K}_m$ is the average traffic flow density of the m-th entrance road section.

S4. calculating an intersection signal period of the crossroad based on the average traffic flow density at the crossroad.

S4 specifically includes
the signal period of the crossroad $$C = \begin{cases} 40 & K \leq 6 \\ 60 & 6 < K \leq 12 \\ 90 & 12 < K \leq 24 \\ 120 & 24 < K \leq 48 \\ 150 & 48 < K \leq 90 \\ 180 & K > 90 \end{cases},$$

where K is the average traffic flow density of the crossroad.

In the specific embodiment, the intersection signal period is the time required for the lights of the signal to be displayed in turn, expressed in C, in seconds.

S5. constructing a crossroad signal machine optimization control algorithm model based on the average lane traffic flow rate of each entrance road section and the average traffic flow density of the crossroad, and obtaining the object signal control green signal ratio of each entrance road section of the crossroad by the aggregation calculation.

S5 specifically includes:

S51. establishing a Cartesian coordinate system at the center of the intersection, calculating the average traffic flow rate $\bar{q}_{13}$ of the X-axis direction section, and calculating the average traffic flow rate $\bar{q}_{24}$ of the Y-axis direction section;

specifically, $\bar{q}_{13}=(\bar{q}_1+\bar{q}_3)/2$, Where $\bar{q}_1$ is the average traffic flow rate from the negative X-axis direction to the positive X-axis direction, $\bar{q}_3$ is the average traffic flow rate from the positive X direction to the negative X-axis direction;

$\bar{q}_{24}=(\bar{q}_2+\bar{q}_4)/2$, where $\bar{q}_2$ is the average traffic flow rate from the negative direction of the Y-axis to the positive direction of the Y-axis, and $\bar{q}_4$ the average traffic flow rate from the positive direction of the Y-axis to the negative direction of the Y-axis.

S52. establishing an optimization signal control objective function $\omega K(t)+\dot{K}(t)=0$ based on feedback control;

establishing a dynamic traffic flow density variation model $$\dot{K}(t) = \lim_{\Delta t \to 0} \frac{r_{13}\bar{q}_{13}\Delta t/L + (1-r_{13})\bar{q}_{24}\Delta t/L}{\Delta t} = \frac{r_{13}(\bar{q}_{13}-\bar{q}_{24})+\bar{q}_{24}}{L};$$

combining the optimization signal control objective function and the dynamic traffic flow density variation model to calculate the green signal ratio $$r_{13} = \frac{\omega KL + \bar{q}_{24}}{\bar{q}_{24}-\bar{q}_{13}}$$

in the X-axis direction, where w>0, K(t) is the average traffic flow density of the crossroad at time t, $\dot{K}(t)$ is the derivative of the average traffic flow density of the crossroad at time t, where L is the length of the entrance road section, $\Delta t$ is an infinitely short time.

In the specific embodiment, the goal of the signal control algorithm based on feedback control is to realize that through the adjustment of the signal the average traffic flow density of the intersection is getting smaller and smaller, and the number of queues is reduced as much as possible. Therefore, the objective function is defined, to achieve the desired results by the dynamic change of the control function.

S6. calculating a green time, a yellow time, and a red time of the crossroad signal timing based on the object signal control green signal ratio and the crossroad signal period.

S6 specifically includes: the green time of the entrance road section in the X-axis direction of the crossroad signal timing $G_{13}=C\times r_{13}$, the red time of the green time of the entrance road section in the X-axis direction $R_{13}=C-G_{13}-Y$, Y is the preset yellow time, and C is the crossroad signal period.

Specifically, in the process of calculating the green time in the X-axis direction, a threshold $G_{13}$ of the green time in the X-axis direction is set as $10 \leq G_{13} \leq C-10$.

S7. forming a signal control scheme instruction for the next signal period of according to the green time, the yellow time and the red time of the crossroad signal timing.

S8. controlling the traffic light of the crossroad carrying out traffic dynamic induction according to the signal control scheme instruction of the next signal period, after the end of the period control scheme of the traffic light.

Figure 4:
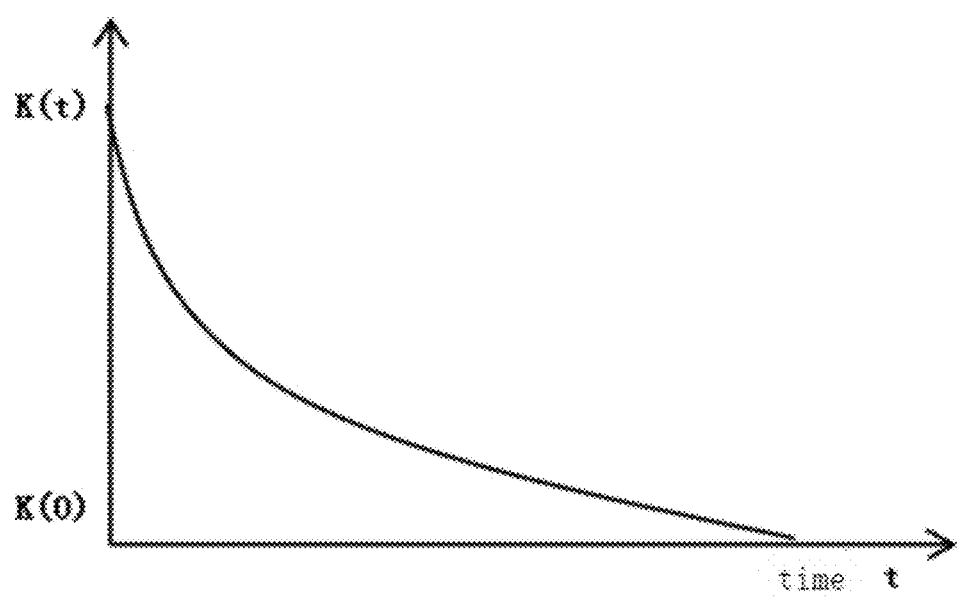
FIG. 4 is a feedback control density variation curve in the present application.

In the specific embodiment, the interpretation of the target control function is that after adjusting by the feedback control, the average traffic flow density of the intersection becomes more and more 0 with time, that is, the number of vehicles at the intersection is less and less, so the traffic efficiency can be maximized and the traffic congestion can be reduced, as shown in FIG. 4.

This application is based on the feedback control theory, extracting the signal control optimization algorithm of intersection, through the real-time detection and comprehensive analysis of the average traffic density of the crossroad, which can greatly improve the traffic operation efficiency of the crossroad; Using two-dimensional active video technology, the real-time traffic status of single crossroad are accurately detected on the main road, formulating an optimal signal control scheme, providing real-time decision-making and emergency response information for traffic management and control, and improving crossroad traffic efficiency and service level.

The above is only the preferred embodiment of the present application, but the scope of protection of the present application is not limited thereto, and any equivalents or modifications of the technical solutions of the present application and the application concept thereof should be included in the scope of the present application within the scope of the technical scope of the present application.

What is claimed is:

1. A video-based crossroad signal machine control method, characterized by, comprising:

S1. collecting lane traffic flow rate and lane traffic flow density of each entrance road section within a preset time interval, by means of video vehicle detectors arranged on each entrance road section of the crossroad;

S2. calculating average traffic flow rate and average traffic flow density of each entrance road section of the crossroad based on lane traffic flow rate and lane traffic flow density of each entrance road section within the preset time interval;

S3. calculating the average traffic flow density of the crossroad based on the average traffic flow density of each entrance road section;

S4. calculating an intersection signal period of the crossroad based on the average traffic flow density at the crossroad;

S5. constructing a crossroad signal machine optimization control algorithm model based on the average lane traffic flow rate of each entrance road section and the average traffic flow density of the crossroad, and obtaining the object signal control green signal ratio of each entrance road section of the crossroad by the aggregation calculation;

S6. calculating a green time, a yellow time, and a red time of the crossroad signal timing based on the object signal control green signal ratio and the crossroad signal period;

S7. forming a signal control scheme instruction for the next signal period of according to the green time, the yellow time and the red time of the crossroad signal timing;

S8. controlling the traffic light of the crossroad carrying out traffic dynamic induction according to the signal control scheme instruction of the next signal period, after the end of the period control scheme of the traffic light.

2. The video-based crossroad signal machine control method according to claim 1, characterized in that, the step S2 specifically comprises:

the average traffic flow rate of each entrance road section $$\overline{q} = \sum_{n=1}^{N} q_n / N,$$

where n is the number of the lane, and N is the total quantity of lanes of the entrance road section, $q_n$ is the lane traffic flow rate of the lane n;

the average traffic flow density of each entrance road section $$\overline{k} = \sum_{n=1}^{N} k_n / N,$$

where n is the number of the lane, and N is the total quantity of lanes of the entrance road section, $k_n$ is the lane traffic flow density of the n-th lane.

3. The video-based crossroad signal machine control method according to claim 2, characterized in that, the step S3 specifically comprises:

the average traffic flow density of the crossroad $$K = \sum_{m=1}^{M} \overline{k}_m / M,$$

where m is the number of the entrance road section of the crossroad, M is the total quantity of entrance road section of the crossroad, $\overline{k}_m$ is the average traffic flow density of the m-th entrance road section.

4. The video-based crossroad signal machine control method according to claim 3, characterized in that, the step S4 specifically comprises:

the crossroad signal period $$C = \begin{cases} 40 & K \le 6 \\ 60 & 6 < K \le 12 \\ 90 & 12 < K \le 24 \\ 120 & 24 < K \le 48 \\ 150 & 48 < K \le 90 \\ 180 & K > 90 \end{cases},$$

where K is the average traffic flow density of the crossroad.

5. The video-based crossroad signal machine control method according to claim 4, characterized in that, the step S5 specifically comprises:

S51. establishing a Cartesian coordinate system at the center of the intersection, calculating the average traffic flow rate $\overline{q}_{13}$ of the X-axis direction section, and calculating the average traffic flow rate $\overline{q}_{24}$ of the Y-axis direction section;

S52. establishing an optimization signal control objective function $\omega K(t) + \dot{K}(t) = 0$ based on feedback control;

establishing a dynamic traffic flow density variation model $$\dot{K}(t) = \lim_{\Delta t \to 0} \frac{r_{13}\overline{q}_{13}\Delta t/L + (1-r_{13})\overline{q}_{24}\Delta t/L}{\Delta t} = \frac{r_{13}(\overline{q}_{13} - \overline{q}_{24}) + \overline{q}_{24}}{L};$$

Combining the optimization signal control objective function and the dynamic traffic flow density variation model to calculate the green signal ratio $$r_{13} = \frac{\omega KL + \overline{q}_{24}}{\overline{q}_{24} - \overline{q}_{13}}$$

in the X-axis direction, where w>0, K(t) is the average traffic flow density of the crossroad at time t, $\dot{K}(t)$ is the derivative of the average traffic flow density of the crossroad at time t, where L is the length of the entrance road section, $\Delta t$ is an infinitely short time.

6. The video-based crossroad signal machine control method according to claim 5, characterized in that, the step S51 specifically comprises:

$\overline{q}_{13} = (\overline{q}_1 + \overline{q}_3)/2$, where $\overline{q}_1$ is the average traffic flow rate from the negative X-axis direction to the positive X-axis direction, $\overline{q}_3$ is the average traffic flow rate from the positive X direction to the negative X-axis direction;

$\overline{q}_{24} = (\overline{q}_2 + \overline{q}_4)/2$, where $\overline{q}_2$ is the average traffic flow rate from the negative direction of the Y-axis to the positive direction of the Y-axis, and $\overline{q}_4$ the average traffic flow rate from the positive direction of the Y-axis to the negative direction of the Y-axis.

7. The video-based crossroad signal machine control method according to claim 6, characterized in that, the step S6 specifically comprises:

the green time of the entrance road section in the X-axis direction of the crossroad signal timing $G_{13} = C \times r_{13}$, the red time of the green time of the entrance road section in the X-axis direction $R_{13} = C - G_{13} - Y$, Y is the preset yellow time, and C is the crossroad signal period.

8. The video-based crossroad signal machine control method according to claim 7, characterized in that, the step S6 further comprises: setting a threshold $G_{13}$ of the green time in the X-axis direction as $10 \leq G_{13} \leftarrow C-10$.

* * * * *